Feb. 14, 1939.            J. W. BARNES            2,147,591
COMBINED GRADEOMETER AND AUTOMATIC AIR SUPPLY INSTRUMENT
Filed March 21, 1938          2 Sheets-Sheet 1
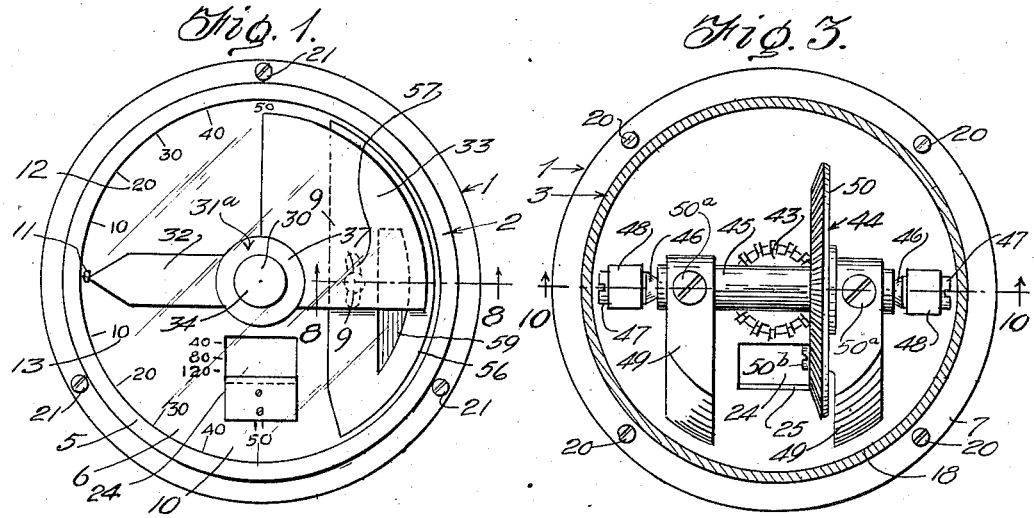
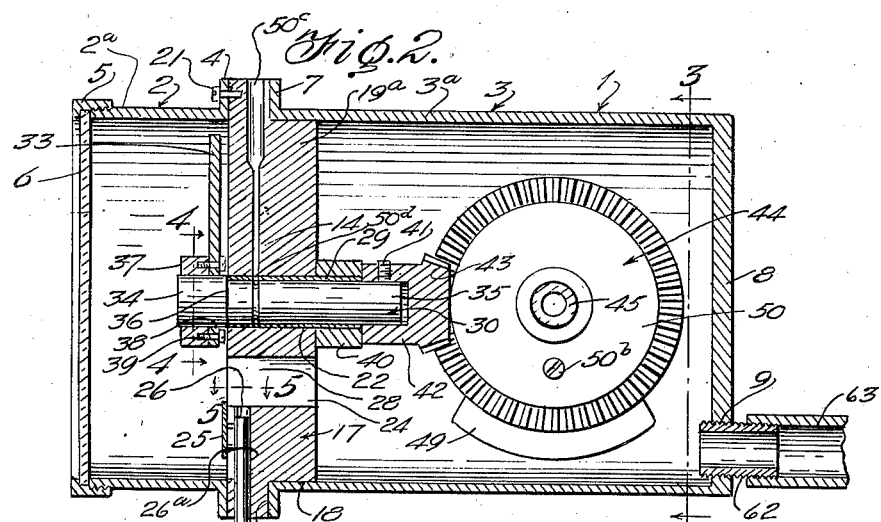
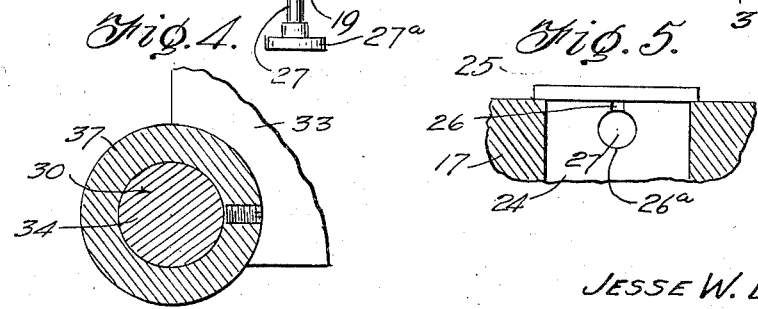
Inventor
JESSE W. BARNES,
By Kimmel & Crowell,
Attorneys.

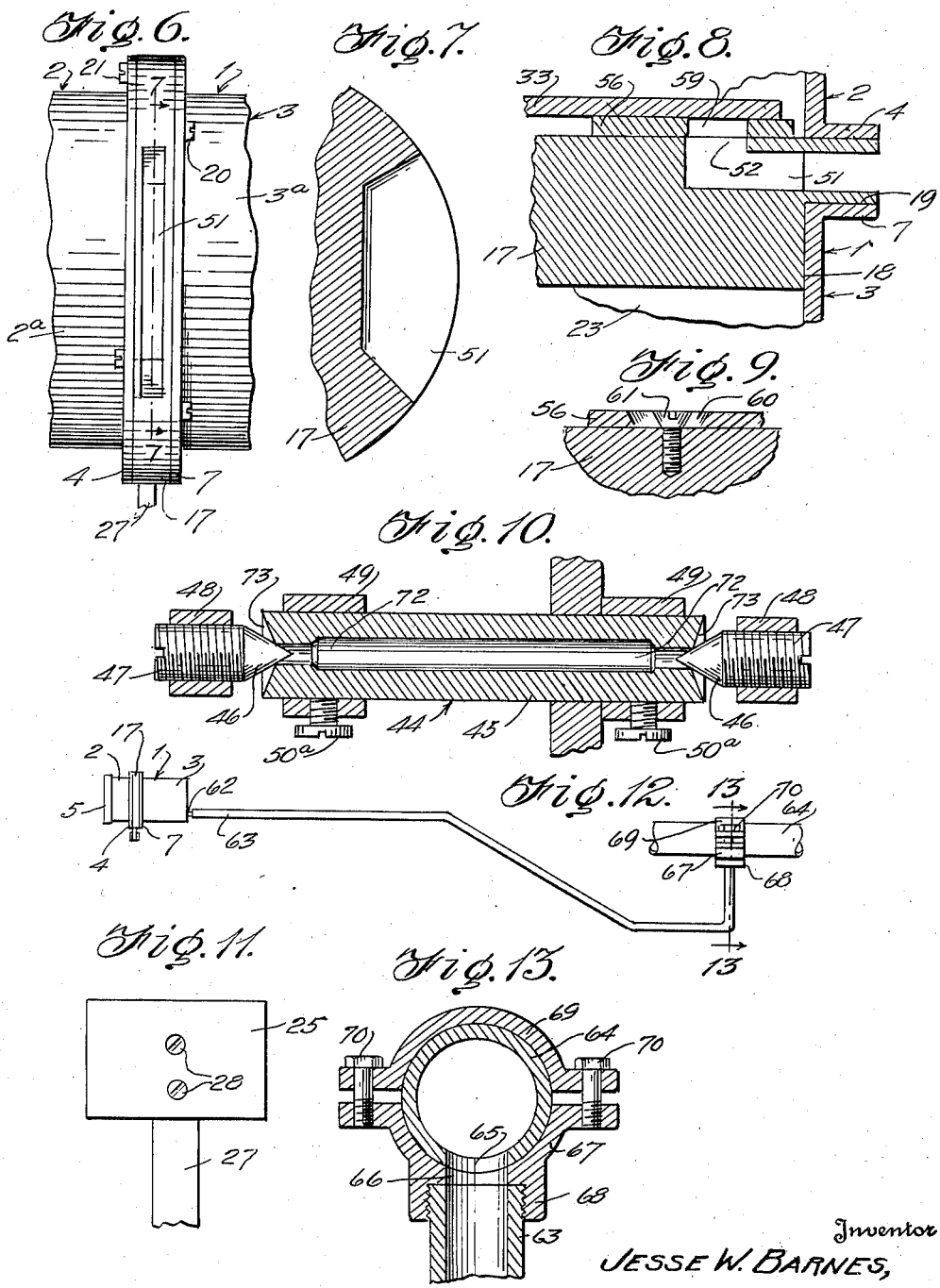

Patented Feb. 14, 1939

2,147,591

UNITED STATES PATENT OFFICE 2,147,591

COMBINED GRADEOMETER AND AUTOMATIC AIR SUPPLY INSTRUMENT

Jesse W. Barnes, Binghamton, N. Y.

Application March 21, 1938, Serial No. 197,256

9 Claims. (Cl. 137—139)

This invention relates to a combined gradeometer and automatic air supply instrument for use in connection with the internal combustion engines of the type used in aeroplanes, trucks and automobiles.

The invention has for its object to provide, in a manner as hereinafter set forth, an instrument of the class referred to for conveying warnings to the operator of land or aerial vehicles of the degree of upward or downward inclination being negotiated, as well as when travelling on an even keel which contributes greatly to safety when operating the vehicles.

The invention further aims to provide, in a manner as hereinafter set forth, a gravity operable instrument of the class referred to for automatically indicating to the driver of the vehicle the grade upon which the vehicle is travelling and simultaneously with such indicating, supplying a controlled amount of air to the intake manifold of the engine for varying the combustible mixture supplied to the combustion chamber of the engine.

A further object of the invention is to provide, in a manner as hereinafter set forth, a gravity operable instrument of the class referred to, operative automatically to not only indicate to the operator of a vehicle the grade on which the vehicle is travelling, but also to automatically provide for supplying a leaner combustible mixture to the engine when the vehicle is travelling down grade than the mixture supplied to the engine when travelling on an even grade, and to automatically provide for supplying a richer combustible mixture to the engine when the vehicle is travelling up grade than the mixture supplied to the engine when travelling on an even grade.

A further object of the invention is to provide, in a manner as hereinafter set forth, a gravity operable instrument for automatically indicating to the driver of a vehicle the grade on which the vehicle is travelling and for automatically changing the condition of a combustible mixture as it passes from a carbureter to the combustion chamber of an internal combustion engine when the vehicle is passing from an even to an up or down grade, thereby providing a saving in gasoline and ensuring a satisfactory operation of the engine under all conditions.

A further object of the invention is to provide, in a manner as hereinafter set forth, a gravity operable instrument of the class referred to for automatically changing the condition of the combustible mixture for an internal combustion engine of a land or air vehicle on a change in the direction in which the vehicle is travelling, i. e., on the level, upgrade or downgrade.

Further objects of the invention are to provide, in a manner as hereinafter set forth, an instrument for the purpose referred to which is simple in its construction and arrangement, strong, durable, compact, readily installed with respect to and for automatically supplying a regulatable amount of air to the intake manifold of an internal combustion engine for the purposes of varying the combustible mixture passing from the carbureter through said manifold to said engine, gravity operable, automatic in its action, thoroughly efficient in its use and comparatively inexpensive to manufacture.

To the above ends essentially and to others which may hereinafter appear, the invention consists of the novel construction, combination and arrangement of parts as will be more specifically referred to and as illustrated in the accompanying drawings, wherein is shown the preferred embodiment of the invention, but it is to be understood that changes, variations and modifications may be resorted to which fall within the scope of the invention as claimed.

In the drawings:—

Figure 1 is a front elevation of a combined gradeometer and automatic air supplying instrument in accordance with this invention, Figure 2 is a longitudinal sectional view of the device with the air supply line broken off, Figure 3 is a section on line 3—3, Figure 2, Figure 4 is a section on line 4—4, Figure 2, Figure 5 is a section on line 5—5, Figure 2, Figure 6 is a fragmentary view in side elevation of the device, Figure 7 is a fragmentary view on line 7—7, Figure 6, Figure 8 is a section on line 8—8, Figure 1, Figure 9 is a section on line 9—9, Figure 1, Figure 10 is a fragmentary section on line 10—10, Figure 3, Figure 11 is an elevation of an adjustable slide for setting the area of an air port, Figure 12 is a side elevation of the instrument as installed with respect to the intake manifold of an internal combustion engine, and Figure 13 is a section on line 13—13, Figure 12.

The instrument is in the form of a horizontally disposed structure 1, including a dial case 2 and a gear case 3. The body parts of the cases 2, 3 are indicated at 2ª, 3ª respectively and are of annular form. The body part 2ª of case 2 is open at each end and provided at its rear end with an outwardly directed annular flange 4 and at its forward end with peripheral threads adapted to be engaged by the threads of an interiorly threaded flanged ring 5 whereby the latter is connected to body part 2ª. Abutting against the forward end edge of the body part 2ª is a transparent disc-like closure 6 which is overlapped by the ring 5 and connected by the latter to said body part 2ª.

The body part 3ª of case 3 is open at its forward end and formed at such end with an outwardly directed annular flange 7. The rear end of body 3ª is closed by an integral rear wall 8 provided eccentrically thereof with a threaded opening 9 for a purpose to be referred to.

A grade indicating dial is provided on the inner face of closure 6. The dial consists of graduations oppositely disposed in multiples of ten, that is to say the dial includes a zero indication designated 11 and sets of graduations extending in opposite directions from zero and arranged in multiples of ten. One set is designated 12 and the other set 13.

Interposed between the flange 4 of case 2 and the flange 7 of case 3, is the body part 17 of the instrument and which is of disc-like form of the desired thickness. The rear portion of the outer edge of body part 17 is rabbeted to form an annular seat 18, an annular shoulder 19 and a reduced portion 19ª. The forward end of case 3 is mounted on seat 18 and flange 7 abuts shoulder 19. The reduced portion 19ª of body 17 extends into case 3 and provides the forward end wall of and a closure for the forward end of case 3. The flange 4 of case 2 abuts the forward face of body part 17. Holdfast means 20, 21 are employed for securing flanges 4, 7 and body 17 together and with the outer edges of the flanges flush with the non-rabbeted portion of the outer edge of body part 17. The front of body part 17 when the latter is secured to and between the cases 2, 3, forms the rear wall of case 2.

The body part 17 in the lower portion of its front part is provided with a vertically disposed recess 26 opening at its upper end into the bottom of port 24. The lower portion of body part 17 rearwardly of recess 26 is formed with a vertically disposed opening 26ª which communicates with the port 24 and recess 26 and which extends from port 24 to the edge of body part 17.

Arranged at the front of body part 17 is a slide 25 for controlling the area of and for closing port 24 to case 3. The slide 25 rides against the front face of body part 17 and is manually adjusted to set position with respect to port 24. For manually adjusting the slide, a vertically shiftable stem 27 is provided which is arranged in the opening 26ª. Carried by the slide 25 are coupling screws which extend through the recess 26 and engage in the stem 27. The slide 25 is formed of very thin tempered sheet metal and the screws extend a slight tension on the slide for releasably retaining it in set position by its engagement with the front of body part 17. The stem 27 depends from body part 17 and has its lower end provided with a push button 27ª.

Mounted in the opening 22 is a bearing bushing 29 flush at its forward end with the front of and having its rear portion extend from the rear of body part 17. Arranged within, abutting the forward end of and extending forwardly from and rearwardly from the bushing 29, is an oscillatory control shaft 30 for a shiftable combined grade indicating and air intake controlling structure 31 formed of pointer 32 and air intake regulating member 33 for case 2. The shaft 30 includes portions 34, 35 of different diameters and the junction of the two diameters form shaft 30 with a peripheral shoulder 36 which abuts against the forward end of the bushing 29. The pointer 32 associates with the dial on the closure for automatically indicating level, up-grade and down-grade and includes a hub 37 at its inner end mounted on and fixed to the portion 34 of shaft 30. The member 33 is quadrant shaped and is provided with an opening 38 for mounting it on portion 34 of shaft 30. The member 33 is arranged rearwardly of hub 37. The latter and member 33 are connected together by holdfast means 39. The hub 37 is detachably connected to shaft 30 to bodily revolve with the latter. The hub 37 and member 33 bodily revolve with the shaft 30 in unison. A stop collar 40 is arranged on the rear end of the bushing 29 and abuts against the rear face of body portion 17. The shaft 30 projects rearwardly from collar 40 and has secured thereon by the holdfast means 41 the hub 42 of a beveled pinion 43.

Arranged within the chamber 23 is a gravity operable operating means 44 for the pinion 43 which in turn will operate shaft 30. The means 44 includes a shaft 45 rotatably suspended on the pointed inner ends 46 of oppositely disposed bearings 47 adjustably mounted in supports 48 which extend laterally rearwardly from the rear face of body part 17. The ends of shaft 45 are formed in a manner to receive the pointed ends of the bearings 47. Mounted on the shaft 45 in proximity to the ends thereof are spaced parallel adjustable weights 49 acting to operate shaft 45 when the vehicle travels upon an up-grade from an even grade and on a down-grade from an even grade. The shaft 45 is disposed at right angles to the shaft 30. The shaft 45 has loosely mounted thereon a beveled gear 50 which meshes with the beveled pinion 43 and provides for the operating of the shaft 30 in an anticlockwise direction when the vehicle travels up-grade and in a clockwise direction when the vehicle travels down-grade. The weights are fixed in adjusted position on shaft 45 by the set screws 50ª. The gear 50 is fixed to the inner side of a weight 49 by a holding screw 50ᵇ. When shaft 30 moves in an anticlockwise direction pointer 32 moves downwardly and carries the member 33 upwardly. When shaft 30 moves in a clockwise direction pointer 32 moves upwardly and member 33 moves downwardly. When the vehicle is travelling on an even grade, the pointer 32 and member 33 will be in the position shown in Figure 1, that is to say, the pointer 32 will indicate zero.

The body part 17 is formed with a flared air input chamber 51 permanently opening into the atmosphere through a part of the edge thereof. The body part 17 is formed with an opening 52 leading from its front to chamber 51.

Adjustably connected to the front of body part 17, is a substantially segmental member 56 against which slides the member 33. The member 56 is adjustably connected to the body part 17 at 57, 58. The member 56 is formed lengthwise thereof with an oppositely tapered elongated air intake opening 59 which aligns with the opening 52 and forms an air intake port for case 2. The means for connecting the member 56 to body part 17 consists of an arcuate slot 60 formed in and centrally of member 56 and a headed screw 61 extending through slot 60 and detachably engaging in body part 17. The slot 60 is of oval contour and has beveled side walls to be engaged by the head of screw 61 as is shown in Figure 9.

Threadably engaging with the opening 9 and extending rearwardly from section 3 is a peripherally threaded union 62 which couples an air supply pipe or line 63 to case 3. The pipe 63 leads to and opens into the intake manifold 64 of the engine. The manifold 64 is arranged between the carburetor and the combustion chamber of the engine and it is formed with an opening 65 which registers with an opening 66 formed in a clamping section 67. The latter has an interiorly threaded tubular extension 68 which threadably engages with the line 63 (Figure 13). The section 67 aligns with and is oppositely disposed with respect to a clamping section 69. The sections 67, 69 are mounted against the periphery of the intake manifold 64 and are detachably connected together by holdfast means 70.

The shaft 45 (Figure 10) is hollow and has beveled end edges 73. The shaft 45 is hollow, as at 72 and will be packed with oil retaining waste, not shown, to lubricate the pointed ends 46 of the bearings 47. The pointed ends 46 of the bearings 47 extend into and bear against the ends of the inner face of shaft 45. By this arrangement, the shaft 45 is suspended and rotatably mounted on the pointed ends 46 of the bearings 47 and is rotated in opposite directions by the weights. The shaft 45, in connection with the weights 49 and gear 50, provides a gravity operable mechanism for automatically operating, through the shaft 30 the pointer and regulating member 33 simultaneously in like arcuate paths, that is to say, simultaneously in unison clockwise and simultaneously in unison counterclockwise.

The member 33 automatically controls the intake of air to the case 2, as when the member 33 moves upwardly the area of the discharging part of opening 49 is increased and when the member 33 moves downwardly the area of the discharging part of opening 59 is decreased, that is to say, when the member 33 moves upwardly a greater volume of air passes through opening 59 into the case 2 and when the member 33 moves downwardly a smaller volume of air passes into the case 2. The arrangement provides that when the vehicle is travelling up grade and with the member 33 moving downwardly a richer combustible mixture is provided and that when the vehicle is travelling down-grade, the member 33 moves upwardly and a leaner combustible mixture is provided.

The air input chamber 51 is always open to the atmosphere. There is a limited amount of air passing from case 3 to the engine when running on a level road. In this connection the pointer 32 is positioned at zero. If the car, truck or aeroplane starts going up an incline, the pointed end of the indicator moves upwardly showing the percentage of grade and the member 33 moves downwardly a corresponding distance closing the opening 59 to conform to the grade, thus, when a ten percent grade is reached the opening 59 will be closed entirely giving the engine the maximum richness of gasoline. When going down an incline the indicator moves downwardly showing the percentage of the grade and the member 33 moves upwardly giving the opening 59 a larger discharge area and resulting in a larger volume of air passing into the engine making the combustible mixture leaner on the down-grade. The adjustment of the member 56 is for the purpose of movement up or down to conform with different sizes of engines. The slide 25 can be set in relation to the port 24 to conform with engines of different H. P. The automatic supply of air to the engine may be cut off entirely by closing the port 24 by means of the slide 25, but even so the operation of the grade indicating means will not be arrested.

The essential feature of the invention is the automatically operable combined pointer 32 and member 33 which act to indicate the degree of up-grade or down-grade and control the volumes of the air automatically supplied to the engine. The instrument shows the degree of grade either up or down and also changes the condition of the combustible mixture to conform with what the engine is doing under all conditions. It will be assumed that the engine is operating from a normal combustible mixture when travelling on the level, but on the up-grade the mixture gets richer as the grade increases and when the grade is ten percent or more the member 33 shuts off all air from case 2 to the engine and makes maximum richness. The combined pointer and regulating member is automatically operated in either direction from normal by the gravity operable mechanism for the shaft 30 which carries the pointer and regulating member.

The weights 49 are adjustably mounted on shaft 45 for the purpose of positioning the pointer 32 at zero independently of the inclination of the device when secured in the vehicle. The weights 49 are detachably connected to shaft 45, after adjustment by the set screws 50a. The gear 50 is loosely mounted on shaft 45, but it is detachably secured to the inner side of one of the counterbalances 49 by the holding screw 50b.

The body part 17 is formed with a lubricant passage 50c which registers with an opening 50d formed in the bushing 29 for the purpose of supplying a lubricant to the shaft 30.

The instrument when used in connection with an aeroplane provides, whereby the operator or pilot has a certain amount of control over the combustible mixture supplied to the motors to cope with different weather conditions which may be met with while the aeroplane is in flight, as the operator has means in convenient reach to restrict the automatic supply of air, i. e., by moving the slide to any position desired. The instrument is to be arranged in the vehicle at a point where the operator may have quick and convenient access to the button on the lower end of stem 27. The warning conveyed by the instrument contributes greatly to the safe operation of the vehicle. The use of the instrument provides for the saving of gasoline as it changes the combustible mixture to conform with the different conditions under which the vehicle is operating. The operation of the instrument is always accurate in its movements with regard to warnings as the possibility of the breaking or displacing of any part thereof is negligible.

The slide 25 is to be closed when starting the engine and it is to remain closed until the engine is fully warmed up. The pointer is fixed to the shaft by a set screw whereby the instrument may be adjusted before use to have the pointer indicate zero.

What I claim is:

1. In a gradeometer and automatic air supply instrument for communication with the intake manifold of the internal combustion engines of land vehicles and air craft, a combined grade degree indicating and combustible mixture varying means, a casing for said means including a controllable air intake and an adjustable air outlet, a gravity operable mechanism for automatically operating said means in an arcuate path to grade degree indicating and combustible mixture varying positions on a change from the grade in which the vehicle is travelling, and a casing for said mechanism communicating with the other casing through said outlet and being formed with an air outlet for permanent communication with said manifold.

2. In a gradeometer and automatic air supply instrument for communication with the intake manifold of the internal combustion engines of land vehicles and air craft, an air input chamber opening into the atmosphere, a dial case communicating with the input chamber, a gear case communicating with the dial case, means for establishing communication between the gear case and the intake manifold of the engine, a grade dial, a pointer for coacting with said dial to indicate the grade the vehicle is travelling, a regulating member for controlling communication between said air input chamber and the dial case for varying the supply of air to the latter, said dial, pointer and member arranged in the dial case, an oscillatory rotatable shaft common to said pointer and member for simultaneously moving them in unison in like arcuate paths in both directions of movement of said shaft, the latter being arranged in said dial case and extended into said gear case, and a gravity operable mechanism suspended within the gear case for automatically moving said shaft in one of its directions of movement to simultaneously move said pointer and member, in unison in a like arcuate path respectively to grade indicating and air control positions on a change from the grade in which the vehicle is travelling.

3. In a gradeometer and automatic air supply instrument for communication with the intake manifold of the internal combustion engines of land vehicles and air craft, an air input chamber opening into the atmosphere, a dial case communicating with the input chamber, a gear case communicating with the dial case, means for establishing communication between said gear case and the intake manifold of the engine, a grade dial, a pointer for coacting with said dial to indicate the grade the vehicle is travelling, a regulating member for controlling communication between said air input chamber and dial case for varying the supply of air to the latter, said dial, pointer and member arranged in said dial case, an oscillatory shaft common to said pointer and member for simultaneously moving them in unison, in like arcuate paths in both directions of movement of said shaft, the latter being arranged in said dial case and extended into said gear case, a gravity operable mechanism suspended within the gear case for automatically moving said shaft in one of its directions of movement to simultaneously move said pointer and member in unison, in the same arcuate path respectively to grade indicating and air control positions on a change from the grade in which the vehicle is travelling, said air input chamber being arranged between the said cases and an adjustable slide for controlling communications between said cases.

4. In a gradeometer and automatic air supply instrument for communication with the intake manifolds of internal combustion engines of land vehicles and air crafts, a shiftable grade indicating pointer, an air intake regulating member secured at one end to the inner end of and simultaneously moving with said pointer, a gravity operable means common to said pointer and member for automatically shifting them respectively to grade indicating and air intake regulating positions on a change from the grade in which the vehicle is travelling, an air input chamber permanently opening into the atmosphere, a dial case communicating with said input chamber and having arranged therein said pointer and member, a gear case communicating with said dial case and adapted to communicate with the intake manifold of the engine, said gravity operable means being suspended within said gear case, said member controlling communication between the air input chamber and said dial case, and means for varying the communication between the cases.

5. In a gradeometer and automatic air supply instrument for communication with the intake manifolds of land vehicles and air crafts, a shiftable grade indicating pointer, an air intake regulating member secured at one end to the inner end of and simultaneously moving with said pointer, a gravity operable means common to said pointer and member for automatically shifting them respectively to grade indicating and air regulation positions on a change from the grade in which the vehicle is travelling, an air input chamber permanently opening into the atmosphere, a dial casing communicating with said input chamber and having arranged therein said pointer and member and into which extends said shaft, a gear case communicating with said dial case and adapted to communicate with the intake manifold for supplying air thereto, said gravity operable means being arranged within the gear case, said member controlling communication between the air input chamber and dial case, means for varying the communication between the said cases, said member being of quadrant contour, and said gravity operable means including a suspended weighted oscillatory element operatively connected to the said shaft.

6. In a gradeometer and automatic air supply instrument for communication with the intake manifold of internal combustion engines of land vehicles and air craft for indicating the grade upon which the vehicle is travelling and for automatically supplying air to the intake manifold of the engine varying the condition of the combustible charge travelling through the manifold to the combustion chamber of the engine on a change from the grade in which the vehicle is travelling, said instrument including a dial case having arranged therein a shiftable grade indicating pointer, and an air intake regulating member secured at one end to the inner end of and simultaneously moving with said pointer, and a gear casing having arranged therein gravity operable means common to said pointer and member for automatically shifting them respectively to grade indication and air intake regulating positions on a change from the grade in which the vehicle is travelling, and an adjustable slide for controlling the volume of air passing from the dial case to said gear case and for shutting off the passage of air from the dial case to the gear case.

7. In a combined gradeometer and automatic air supply instrument for communication with the intake manifold of internal combustion engines of land vehicles and air craft, a body part, a dial case secured to the front of said body part and provided therein with a dial and a shiftable pointer for travelling in an arcuate path for coaction with the dial, a gear case connected to the rear of said body part and provided with means for establishing communication between such case and the intake manifold of the engine for supplying air to said manifold for varying the condition of a combustible change passing through the manifold to the combustion chamber of the engine, said body part being formed with an air input chamber permanently opening into the atmosphere and with a port leading from said chamber to the dial case, a plate adjustably connected to the front of said body part and within the dial case and formed with an elongated opening having a portion registering with said port, a shiftable regulating member for travelling in an arcuate path for varying and for closing said opening, said member being connected to said pointer for moving in unison with the latter in the same arcuate path, said body part being formed with an air passage for establishing communication between said cases, adjustable means for closing and for varying the volume of air passing through said passage, and an automatically operable shifting means for said pointer and member including an oppositely revoluble shaft mounted in said body part and extended into said cases, bodily carrying said pointer and member for moving them in unison in the same direction of movement thereof, and a gravity operable operating mechanism for and engaging with the inner end of said shaft, said mechanism being suspended in said gear case, and said shaft having said pointer connected to its forward end.

8. In a gradeometer and automatic air supply instrument for communication with the intake manifold of the internal combustion engines of land vehicles and air crafts for indicating the grade upon which the vehicle or craft is travelling and for automatically supplying air to the intake manifold of the engine varying the condition of the combustile charge travelling through the manifold to the combustion chamber of the engine on a change in the grade the vehicle or craft is travelling, said instrument including a shiftable grade indicating pointer, an air intake regulating member secured at one end to the inner end of and simultaneously moving with said pointer, a gravity operable means common to said pointer and member for automatically shifting them respectively to grade indicating and air intake regulating positions on a change in the grade which the vehicle or craft is travelling, an air input chamber permanently opening into the atmosphere, a dial case communicating with said input chamber and having arranged therein said pointer and member, a gear case communicating with said dial case and adapted to communicate with the intake manifold of the engine, said gravity operable means being suspended in said gear case, said member controlling communication between the air input chamber and said dial case, and means for varying the communication between said cases.

9. In an instrument for the purpose set forth, a grade indicating dial, a case for the dial, a body part having said casing secured to its front surface, a gear case secured to the rear surface of said body part and adapted to communicate with the intake manifold of an engine, said body part being formed with an air input chamber opening into the atmosphere and into the dial case, said body part being formed with an air passage for establishing communication between said cases, an oscillatory combined grade degree indicating and combustible mixture varying means supported by said body part and extended into the dial case for simultaneous correlation with the dial and controlling the input of air into the dial case, and a gravity operable mechanism suspended in the gear case and connected to said means for automatically operating the latter.

JESSE W. BARNES.